Jan. 8, 1963
K. HIYAMA
3,072,217
RETRACTABLE MOBILE SCAFFOLD
Filed March 28, 1960
5 Sheets-Sheet 1
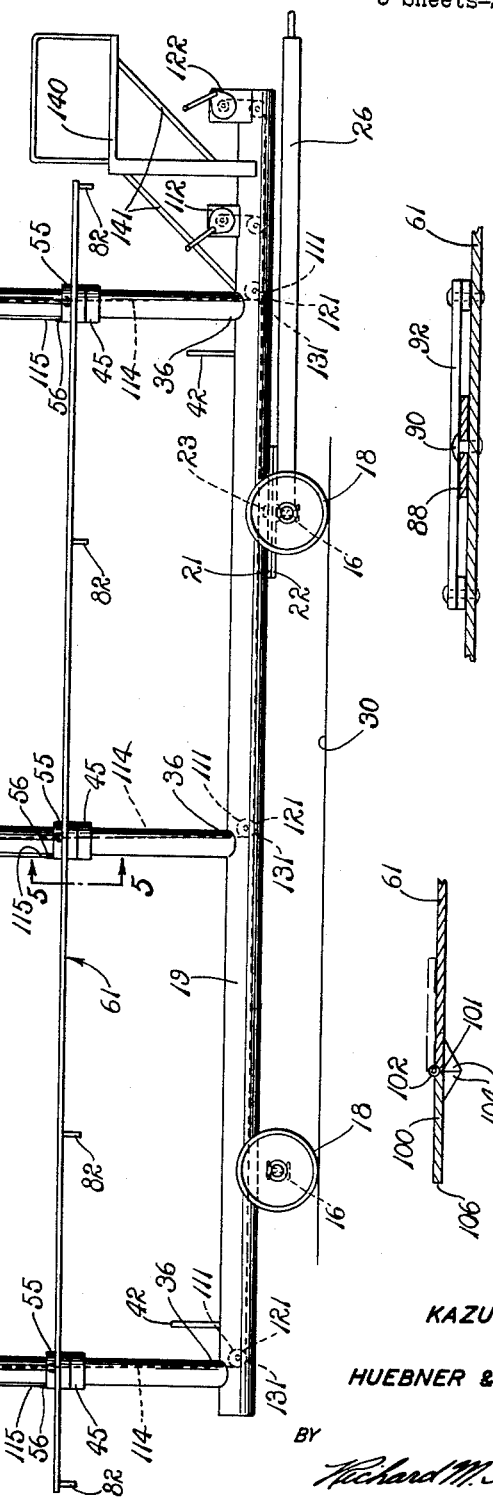
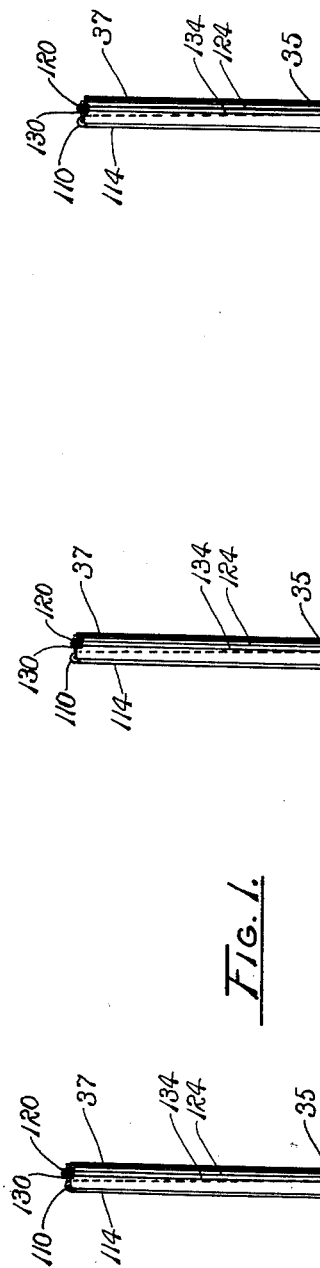
KAZUO HIYAMA
INVENTOR
HUEBNER & WORREL
ATTORNEYS
BY
Richard M. Worrel

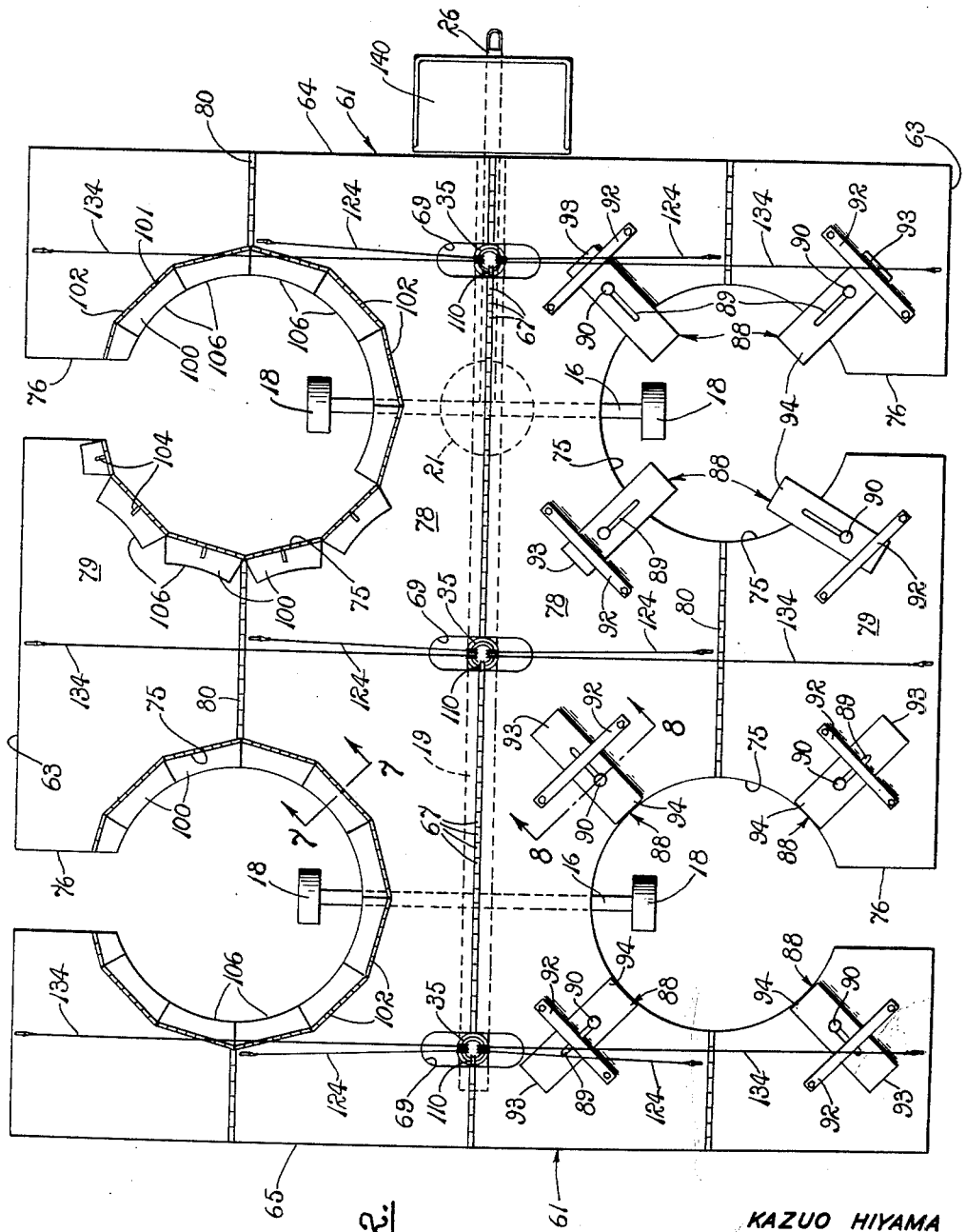

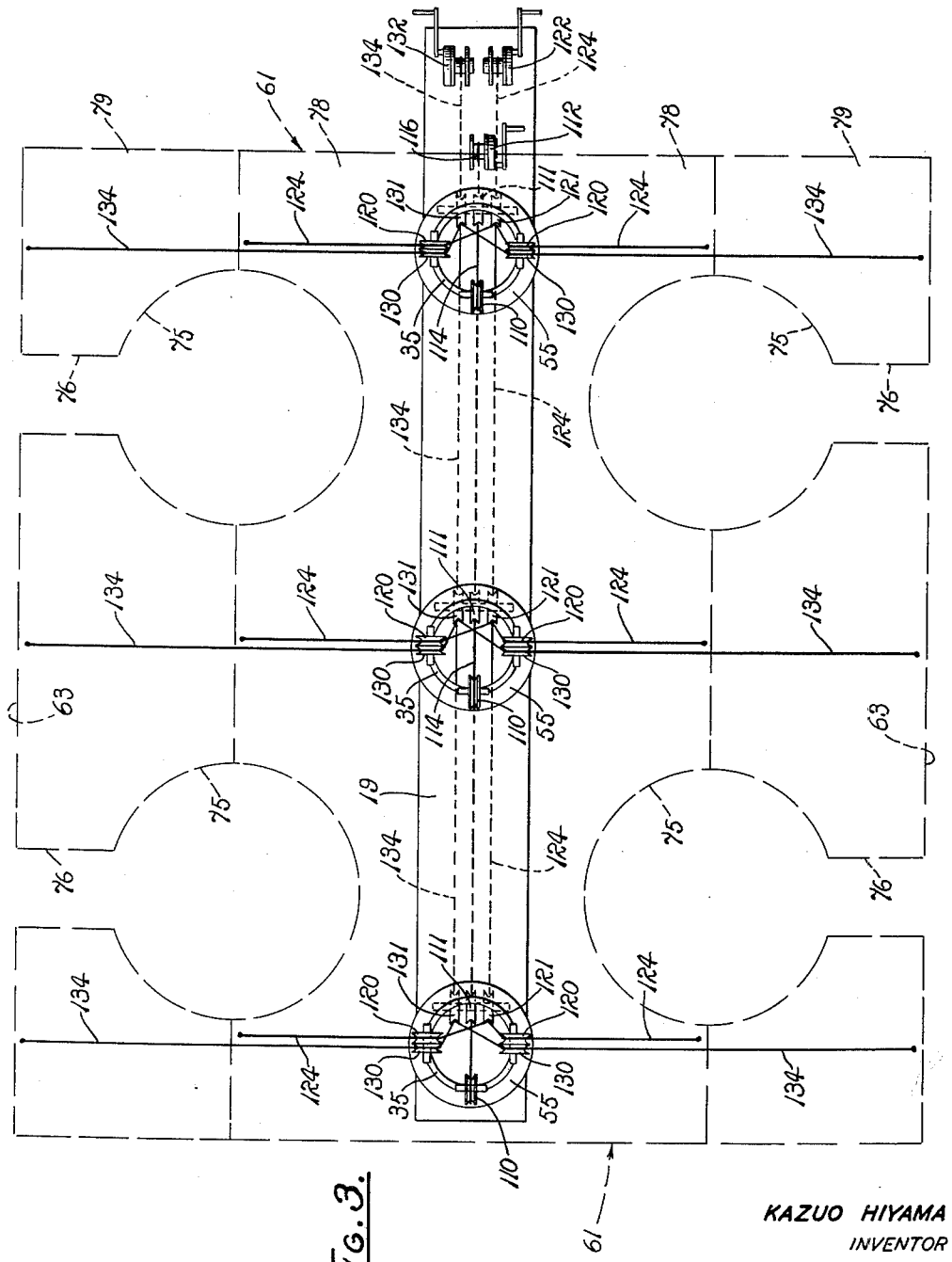

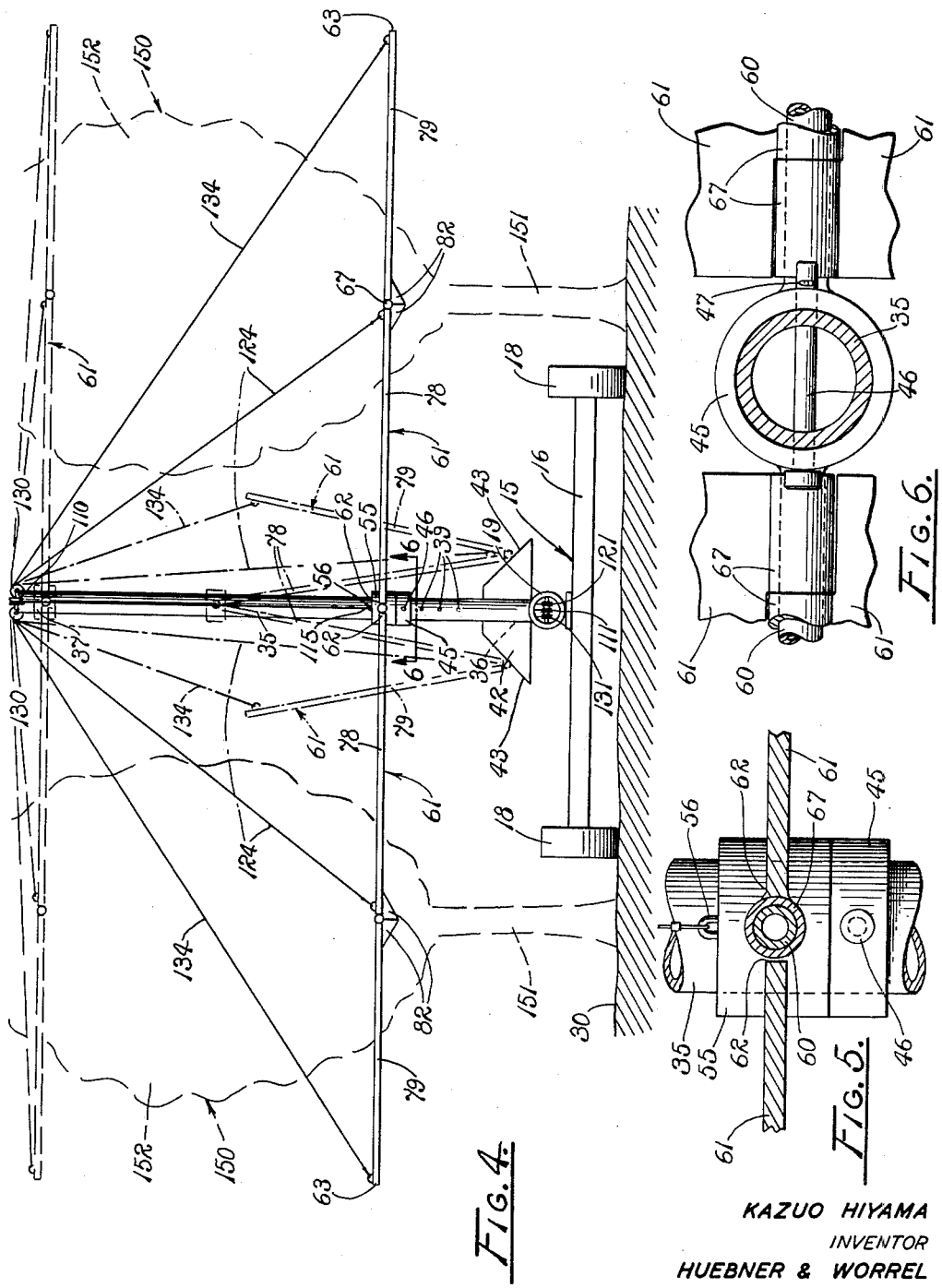

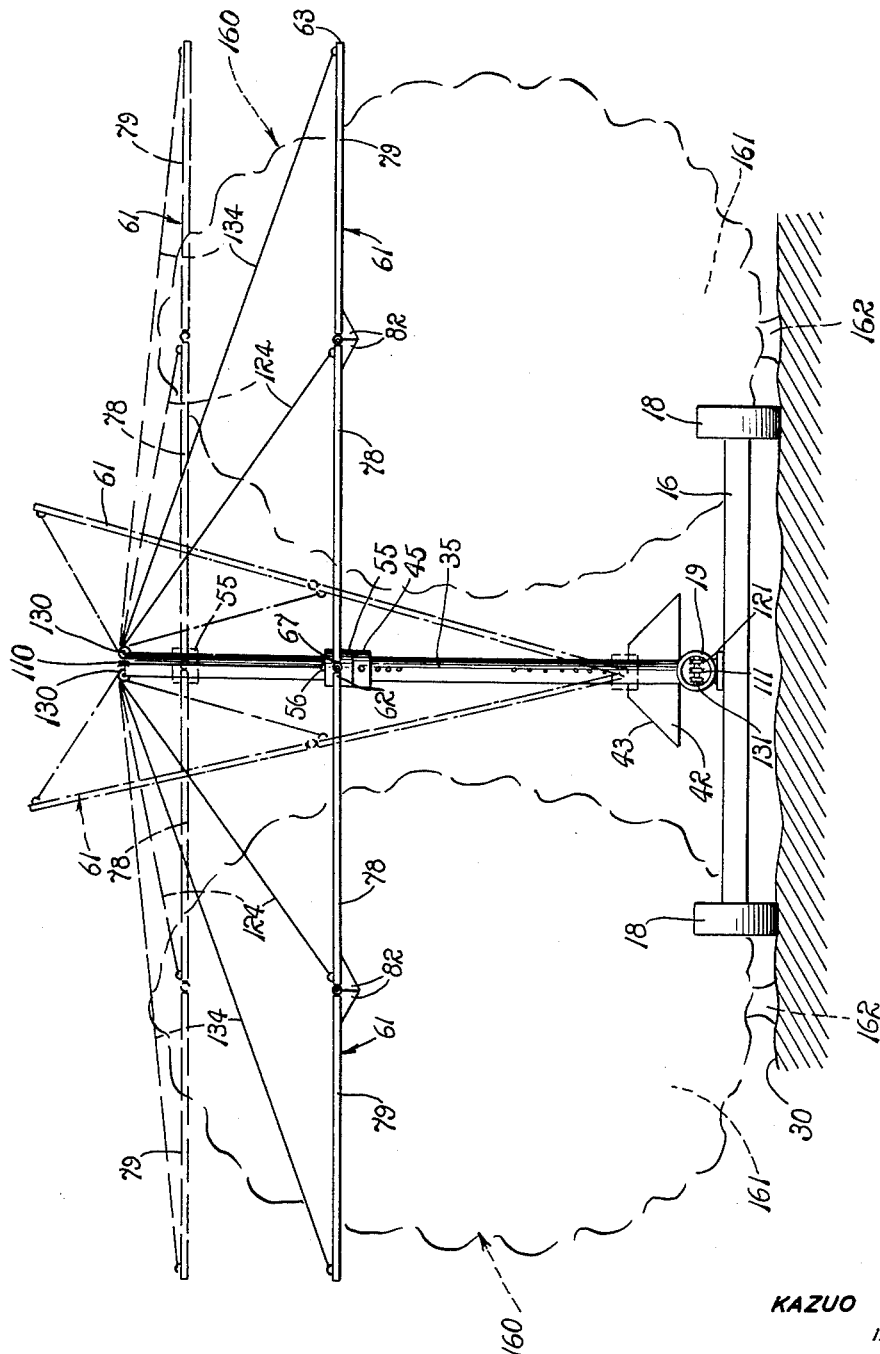

United States Patent Office 3,072,217
Patented Jan. 8, 1963

3,072,217
RETRACTABLE MOBILE SCAFFOLD
Kazuo Hiyama, 8184 E. Adams, Fowler, Calif.
Filed Mar. 28, 1960, Ser. No. 17,907
6 Claims. (Cl. 182—63)

The present invention relates to a retractable mobile scaffold, and, more particularly, to an apparatus including a workman's support movable between a retractable transporting position and a position adapted to extend about a tree, or other upright object, for supporting a workman in elevated position adjacent to the object.

The principles of the present invention are conveniently described in relation to the care of fruit trees and in the harvesting of the fruit thereof. In pruning and thinning trees and picking the fruit, it is obviously necessary to reach the upper branches of the tree. Ladders are widely used for this purpose but it has also been known to provide portable or mobile scaffolds in an effort to minimize the time and labor involved. The prior portable scaffolds of which I am aware are too time consuming to erect about each tree to be attended inasmuch as they come in several sections which must be assembled and interconnected. The known mobile scaffolds do not provide workman access to the full circumference of the tree without requiring considerable changing of position of the scaffold and corresponding time delays.

The subject scaffold is believed to obviate many of the problems of the prior art devices of this nature. While the present scaffold is excellently suited for use in the care of trees, as outlined above, it will be evident as the description proceeds that it has utility in supporting workmen in elevated position about various upright objects other than trees.

Accordingly, it is an object of the present invention to provide a retractable mobile scaffold.

Another object is to provide a workman's support movable between a retracted transporting position and a position adapted to extend about an upright object, such as a tree, for supporting a workman in elevated position adjacent to the object.

Another object is to provide a scaffold of the type described in the preceding two paragraphs which enables a workman supported thereon to have access to the full circumference of the tree, or the like, without changing the position of the scaffold.

Another object is to minimize the time, labor, and expense involved in performing various operations or tasks in elevated position about upright objects, such as the pruning and thinning of trees and the picking of fruit therefrom.

Another object is to provide a mobile scaffold which is easily adjusted between a collapsed or retracted transporting position and a working position in substantially circumscribing relation to an upright object adjacent to which it is desired to support a workman in elevated position.

Another object is to provide a mobile scaffold, including workman support platforms, adapted to travel between adjacent rows of trees in an orchard with the platforms in retracted position, and, after being stopped in predetermined position between said rows, to spread the platforms laterally outwardly to receive adjacent trees in said rows whereby such trees are substantially circumscribed by the platforms.

These, together with other objects, will become more fully apparent upon reference to the following description and accompanying drawings.

In the drawings:

FIG. 1 is a side elevation of a mobile scaffold embodying the principles of the present invention.

FIG. 2 is a top plan view of the scaffold of FIG. 1 showing the main workman supporting platforms in extended position, and, for convenience of illustration, showing two different forms of auxiliary support platforms respectively on the main platforms on opposite sides of the scaffold.

FIG. 3 is a diagrammatic plan view similar to FIG. 2 but somewhat out of proportion so as to show more clearly the mechanism for controlling the movement and adjustment of the workman support platforms.

FIG. 4 is a somewhat enlarged, end elevation of the scaffold of FIGS. 1 and 2 with the platforms shown in full lines in lower extended positions and receiving trees, illustrated in dashed outline, therewithin and with the platforms shown in dashed lines in both retracted positions and upwardly extended positions.

FIG. 5 is a somewhat enlarged, fragmentary, cross-section taken on line 5—5 in FIG. 1.

FIG. 6 is a somewhat enlarged, fragmentary horizontal section taken on line 6—6 in FIG. 4.

FIG. 7 is a somewhat enlarged, vertical, fragmentary section taken on lines 7—7 in FIG. 2 with an auxiliary platform shown extended in full lines and retracted in dashed lines.

FIG. 8 is a fragmentary, somewhat enlarged, vertical section taken on line 8—8 in FIG. 2.

FIG. 9 is a view similar to FIG. 4 but illustrating utility of the subject scaffold with low hanging, short trunk trees, such as citrus trees, with the platforms being shown in retracted and intermediate positions in dashed lines and in extended positions in full lines.

Referring more particularly to the drawings, the subject scaffold includes a substantially horizontal frame 15 having elongated, front and rear, transverse axles 16. Wheels 18 are journaled on opposite ends of the axles and support the frame for earth-traversing movement. The frame also includes an elongated hollow, central tube 19 rigidly connected to the rear axle and transversely overlying the front axle. An upper, fifth wheel plate 21 is secured to the forward end portion of the tube and slidably overlies a lower turntable 22 rigidly connected to the front axle. An axis member 23 concentrically pivotally interconnects the upper plate and turntable for relative rotatable movement therebetween. An elongated rigid tongue 26 is centrally connected to the front axle and extended forwardly therefrom underneath the tube. In this manner, the frame can be attached to a draft vehicle, such as a tractor or a truck, neither of which are shown, and drawn over the earth, as 30. Further, the frame can be steered inasmuch as the front wheels 18 are turnable relative to the tube upon applying lateral thrust to the tongue.

A plurality of elongated, rigid masts 35 of hollow tubular construction provide lower ends 36 rigidly connected to the tube 19 of the frame 15 in longitudinally, substantially equally spaced relation therealong, as best illustrated in FIG. 1. In the illustrated embodiment, front, rear, and intermediate masts are provided. The masts extend upwardly from the tube in a substantially common vertical plane centrally bisecting the frame and provide open upper ends 37. The lower ends of the masts are also open and communicate individually with the tube. As illustrated in FIG. 4, each of the masts provides a plurality of rearwardly disposed apertures 39 in vertically spaced relation therealong. Also, trapezoidal camming plates 42 are secured to the tube inwardly adjacent to the front and rear masts.

Adjustable support collars 45 are fitted about the masts 35 and connected thereto by insertion of the pins 46 through the collars and selected apertures 39, as illustrated in FIGS. 4, 5, and 6. Keys 47 are connected to the pins thereby to hold the same in the masts but to permit easy removal thereof for selectively elevationally adjusting the collars on the masts. It is to be noted that in any selected position of the collars, all of the collars are in a substantially common horizontal plane normal to the masts.

A plurality of slide collars 55 are individually elevationally slidably fitted on the masts 35 for movement between positions rested on their respective support collars 45, as shown in full lines in FIGS. 4 and 9, and positions elevationally upwardly spaced from the support collars, as shown in dashed lines in FIG. 4. Eyelets 56 are secured to the slide collars for a purpose to be described. It will be obvious that the weights of the slide collars 55 tend to slide the collars downwardly on their respective masts 35. Such downward thrust may be augmented, if desired, by adding weight thereto or by means of any desired depressing medium, such as a control ram, winch and cable arrangement, not shown, or the like.

The slide collars 55 are rigidly interconnected by a plurality of coaxial hinging shafts 60, best seen in FIGS. 5 and 6. A pair of substantially rectangular main platforms 61 are provided and each has an inner edge 62, an outer edge 63, and front and rear edges 64 and 65, respectively. Hinging sleeves 67 are connected to the inner edges of the main platforms in longitudinally spaced relation therealong and are rotatably fitted on the hinging shafts 60. Adjacent sleeves extend from opposite platforms throughout the length of the shafts. Each platform has a plurality of elongated notches 69 inwardly extended from the inner edge of such platform and about the masts 35. The platforms are thus supported on the masts by the support collars, hinge shafts, and hinge sleeves, for elevational pivotal movement about a substantially horizontal axis, defined by the hinge shafts, above and below a substantially horizontal plane wherein the platforms are coplanar. Of course, elevational adjustment of the support collars on the masts serves elevationally to adjust the inner edges of the platforms.

Each of the main platforms 61 has a pair of substantially circular tree-receiving openings 75 therein. The openings are concentric to centers located substantially equidistantly between the inner and outer edges 62 and 63 of their respective platforms and in longitudinally spaced relation to each other. The centers of the openings are also preferably substantially equally spaced from their respectively adjacent front and rear edges 64 and 65. Elongated, transversely extended trunk-receiving slots 76 extend laterally outwardly from the openings to the outer edges of each main platform. As best seen in FIG. 2, the front and rear slots are individually in corresponding transverse vertical planes with the front and rear axles 16 and are wider than the wheels for receiving the same therethrough, as will be seen hereafter.

Each of the main platforms 61 also is preferably longitudinally divided into an inner section 78 and an outer section 79. Each outer section is pivotally connected to its respective inner section by means of an elongated hinge 80. Each hinge has an axis extended longitudinally of the main platform through the centers of the openings 75 and thus is equidistantly spaced between the inner and outer edges 62 and 63. The outer section of each main platform is pivotal between a position folded toward the upper surface of its respective inner section, as shown in dashed lines in FIG. 4, and a position substantially coplanar with its respective inner section, as shown in full lines in FIGS. 4 and 9. Abutments 82 are secured to the lower surfaces of the inner and outer sections adjacent to the hinges 80 for engagement in said coplanar positions of the sections thereby to preclude pivoting movement of the outer sections toward the lower surfaces of their respective inner sections, as is believed clearly evident in FIG. 4.

With reference to FIG. 2, a first form of an auxiliary, elongated, rectangular, diving board-type platform 88 is illustrated on the main platform 61 which is on the right side of the frame 15 with respect to the normal forward direction of travel thereof. Four auxiliary platforms are associated with each tree-receiving opening 75. Each such auxiliary platform provides an elongated, longitudinally extended slot 89 therein longitudinally slidably receiving a bolt 90 secured to the main platform in radially spaced relation to its respective opening. Inverted U-shaped brackets 92 are also secured to the main platforms and are extended over the auxiliary platforms outwardly from the bolts with respect to the openings. The platforms thus have outer ends 93 slidably received under the brackets and inner ends 94. The auxiliary platforms are movable radially with respect to their associated tree-receiving openings between work positions with their inner ends extended into such openings, as illustrated in the right forward tree-receiving opening in FIG. 2, and retracted positions with their inner ends withdrawn from their associated openings, as illustrated in the right rear openings in FIG. 2. The brackets are wide enough to permit limited horizontal pivoting of the auxiliary platforms with respect to their bolts, as illustrated with one of the forward auxiliary platforms.

A second form of auxiliary, shelf-type platform is indicated by the numeral 100 in FIG. 2. For convenience of illustration, the auxiliary shelf-type platforms are associated with the tree-receiving openings 75 in the main platform 61 at the left of the frame 15 with respect to the normal forward direction of travel of the frame. These auxiliary platforms have a substantially trapezoidal shape and have outer edges 101 individually pivotally connected to the main platform by hinges 102, for elevational pivotal movement between retracted positions overlying the main platform, as illustrated in the left forward opening in FIG. 2, and work positions coplanar with the main platform and extended into their respective tree openings, as otherwise illustrated at the front and the rear of the left main platform in FIG. 2. Abutments 104, best illustrated in FIGS. 2 and 7, are connected to the main platform about the openings and to the auxiliary platforms 100 for precluding downward pivoting movement of the auxiliary platforms for their described coplanar work positions. Preferably, the auxiliary platforms have arcuate inner edges 106 is substantially continuous circular formation when the auxiliary platforms are all in work positions.

While both the auxiliary platforms 88 and 100 have been illustrated and described as part of one scaffold, it is to be understood that ordinarily, the same form of auxiliary platform would be provided with each main platform 61. That is, all of the tree-receiving openings 75 would be provided with either the board-type platform 88 or the shelf-type platform 100. Both auxiliary platforms have been included in a single scaffold on the present disclosure for brevity of illustration. It will be evident, however, that the scaffold may be constructed without any auxiliary platforms, if desired.

An inside elevational control mechanism is provided for raising and lowering the slide collars 55 and thus the inner edges 62 of the main platforms 61. This control mechanism includes a plurality of upper pulleys 110 individually rotatably mounted on the upper ends 37 of the masts 35 for rotation about longitudinally spaced parallel axes extended transversely of the frame 15. Also, lower pulleys 111 are rotatably mounted within the central tube 19 individually underneath the lower ends 36 of the masts. An inside control winch 112 is mounted on the forward end of the tube and includes a ratchet mechanism for controlling rotation of the winch. Elongated inner cables 114 have ends 115 individually connected to the eyelets 56 on the slide collars and opposite ends 116 connected to the winch. The cables extend from their respective collars over the upper pulleys mounted on the masts supporting such collars, thence downwardly through the masts around the lower pulleys therebelow, and thence forwardly through the tube to the winch, as best illustrated in FIGS. 1, 3, and 4. By rotating the winch in one direction, the cables are wound around the winch thereby to elevate the slide collars on the masts. The ratchet mechanism of the winch elevationally holds the slide collars in whatever position they are placed. By releasing the ratchet and allowing the cables to pay outwardly from the winch, the slide collars are allowed to gravitate downwardly on the masts. Although not shown, auxiliary hydraulic means or any other suitable means may be provided for assisting gravitational descent of the slide collars as will be readily understood by anyone skilled in the art. Of course, the inner edges of the main platforms move upwardly and downwardly with the slide collars.

An outside elevational control mechanism operates in principle similar to the inside elevational control mechanism described above and includes a plurality of upper sheaves 120 rotatably mounted on opposite sides of the upper ends 37 of the masts 35 for rotation about axes extended longitudinally of the frame 15, as best illustrated in FIGS. 1, 3, and 4. Lower sheaves 121 are journaled in the tube 19 respectively adjacent to the lower pulleys 111 and thus below each of the masts. An outside control winch 122 with a ratchet mechanism associated therewith is mounted on the forward end of the tube in front of the end winch 112, and intermediate cables 124 interconnect this winch and the main platforms 61 in laterally outwardly spaced relation to their inner edges 62 and inwardly adjacent to the hinges 80. It is to be noted in FIG. 3, however, that the cables are connected to the inner sections 78 of the main platforms. These cables are trained over the upper and lower sheaves and extend through the masts and the tube as described in connection with the cables 114. Rotation of the end winch 122 in opposite directions pivots, or allows gravitational pivoting of, the main platforms about the shafts 60 above and below a horizontal plane. The ratchet mechanism holds the platforms in the positions to which they are pivoted.

An outer section control mechanism includes upper sheaves 130 mounted for rotation on the same axes as the upper sheaves 120, lower sheaves 131 mounted for rotation on the same axes as the lower sheaves 121 and lower pulleys 111, and an outer section control winch 132 mounted adjacent to the outside control winch 122. Outer cables 134 are connected to the winch 132, are threaded through the tube 19 and masts 35, are respectively trained over the upper and lower sheaves 130 and 131, and are connected to the outer sections 79 of the main platforms 61 adjacent to their outer edges 63, as best illustrated in FIGS. 3 and 4. Again, the winches 132 have associated ratchet mechanisms. The outer section control mechanism is operated by rotating the winch 132 thereby pivoting the outer sections of the main platforms about their hinges 80 between their folded positions relatively adjacent to the inner sections 78 and the described coplanar positions.

The various control mechanisms described above effect simultaneous control of the main platforms 61 on opposite sides of the masts 35. However, it will readily be understood that the platforms can be individually controlled, if preferred although balanced operation is preferred. Also while cables 114, 124 and 134 are specifically disclosed for elevationally adjusting and pivoting the platforms, any other suitable means can be employed.

A riding stand 140 is secured by braces 141 to the forward end portion of the tube 19 endwardly of the main platform 61 and generally above the winches 122 and 132.

*Operation*

The operation of the described embodiment of the subject invention is believed to be apparent and is summarized at this point.

Assuming that it is desired to use the subject scaffold for pruning an orchard of peach trees 150, for example, the frame 15 is connected to a draft vehicle, not shown, by means of the tongue 26. The main platforms 61 are moved into retracted positions in inverted, V-shaped relation to each other closely adjacent to opposite sides of the masts 35 by turning the inside control winch 112 so as to pull the slide collars 55 toward the upper ends 37 of the masts. Simultaneously, the cables 124 and 135 are payed out so as to lower the outer edges 63 of the main platforms relative to the inner edges. In so doing, the slots 76 pass over, and thereby permit movement of platforms inwardly of, the wheels 18.

It usually is also desirable to fold the outer sections 79 of the main platforms 61 toward the inner sections 78 to lower the center of gravity of the scaffold during transport and whereby the platforms are W-shaped in end elevation. To do this, the cables 134 are wound in around the outer section control winch 132 either before, during, or after the slide collars 55 are elevated. If said folding is done after the main platforms are in inverted V-shaped relation, the slide collars are subsequently lowered by paying out the cables 114. The retracted W-shaped, folded position of the main platforms is illustrated in dashed lines in FIG. 4. Whether the platforms are in W-shaped or inverted V-shaped relation, the outer edges 63 of the platforms are spaced within the maximum width of the frame, that is, inside the wheels 18 when the main platforms are in retracted position. It is also to be observed in FIG. 4 that in the retracted positions of the platforms, the hinges 80 are respectively above the side edges 43 of the camming plates 42.

The scaffold is then drawn between adjacent rows of trees 150 in such an orchard with workmen riding on the stand 140. The scaffold is stopped between four such trees to be pruned so that the centers of the openings 75 are individually in substantially common vertical planes with the centers of the trees outwardly adjacent thereto, and so that the slots 76 are substantially aligned with the trunks 151 of their respectively adjacent trees.

Assuming that both of the main platforms 61 are retracted in their W-shaped, folded positions, as illustrated in dashed lines in FIG. 4, the cables 134 are payed out to lower or unfold the outer sections 79 to positions close to the wheels 18 but so that the outer edges 63 do not engage the ground 30. It may be necessary manually to force the outer edges of the outer sections 79 downwardly past the inner branches 152 of the trees or to lower the slide collars 55 to afford more pivoting clearance for the outer sections. The cables 114 are then slowly payed out while the cables 124 are correspondingly wound about the outside control winch 122. This lowers the slide collars 55 and the inner edges 62 of the main platforms and correspondingly moves the outer edges 63 of the main platforms laterally outwardly and upwardly relative to the frame 15. Sliding engagement of the hinges 80 with the camming edges 43 assists in spreading the inner sections 78 out away from the masts 35. In order to prevent scraping, or other engagement, of the edges 63 with the ground 30, it may be necessary slightly to lift the outer sections 79 relative to the inner sections 78 by winding in on the cables 134. As soon as the slide collars are below the position where such scraping can occur, the cables 134 are let out to allow the outer sections to move into their coplanar positions.

As the main platforms 61 move toward horizontal positions, the tree receiving openings 75 and the slots 76 pass over the wheels 18 and receive the tree trunks 151, and the openings 75 are individually fitted upwardly about the branches 152 of the trees 150. When the main platforms are in their extended horizontal positions, as illustrated in full lines in FIG. 4, they substantially circumscribe the branches of the trees, except for the narrow width of the slots, which width is preferably about three to four feet in commercial embodiments of the scaffold. By winding in all of the cables 112, 124 and 134, the platforms are raised about the trees to desired work positions. The support collars 45 are adjusted upwardly against the slide collars and held in such positions by their pins 46. The slide collars and inner edges of the platforms are thus dependably supported on the masts 35. The ratchet mechanisms of the winches 122 and 132 are locked to support the main platforms outwardly from the shafts 60 by the cables 124 and 134. Of course, the abutments 82 afford additional support for the outer sections 79.

The foregoing description of extension of the main platforms 61 has assumed that the main platforms were retracted in W-shaped, folded positions, as illustrated in FIG. 4. As suggested above, however, the main platforms can be transported in an inverted, V-shaped relation with their respective inner and outer sections 78 and 79 in coplanar relation. In this event, the slide collars 55 are located relatively close to the upper ends 37 of the mast 35 in said retracted positions. In order to extend the main platforms when retracted in this manner, the cables 114 are slowly payed out while the cables 124 are correspondingly wound in. This lowers the inner edges 62 while raising the outer edges 63. Again, however, it may be necessary to wind in the cables 134 slightly in order to prevent the outer edges 63 from engaging or scraping against the ground 30. As the inner edges move downwardly and the outer edges outwardly and upwardly, the slots 76 receive the trunks 151 of the trees 150 and the tree receiving openings 75 are fitted around the branches 152 of the trees. The main platforms are then raised to the desired work positions in elevationally spaced relation to the ground 30, and the support collars 45 are connected to the masts 35 under the slide collars 55. The ratchet mechanisms of the winches 112, 122, and 132 are locked to prevent the cables from unwinding.

With the main platforms 61 in their extended positions, workmen step onto the main platforms from the stand 140 and have access to the entire circumference of each of the trees 150. The slots 76 are sufficiently narrow that the workmen can easily step over or straddle them in working about each tree. If the trees are somewhat smaller than the openings 75, the auxiliary platforms 88 or 100 are extended inwardly toward the trees for enabling workmen to walk closer to the branches of the trees. In the case of the platforms 88, they are slid inwardly toward the trees. The auxiliary platforms 100 are pivoted into their positions.

As described, the horizontal plane of the platforms 61 can be elevationally adjusted about the trees 150 so that workmen can prune both the upper and the lower branches 152. An uppermost position is illustrated in dashed lines in FIG. 4. Elevational adjustment is accomplished by winding in or paying out the cables 114, 124, and 134 and by adjusting the positions of the stationary collars 45 under the slide collars 55. Alternatively, the platforms can be supported adjacent to the lower ends 36 of the masts 35 and ladders, not shown, upwardly extended from the platforms.

After each tree 150 has been taken care of, and the workmen step onto the stand 140, the inner cables 114 are wound in on their end winch 112 while the intermediate and outer cables 124 and 134 are correspondingly payed out so as to move the main platforms 61 into their collapsed, inverted V-shaped coplanar or folded positions. Obviously, the slots 76 again pass over the trunks 151 of the trees in moving the main platform away from the trees. The scaffold is then driven down the row opposite to four other trees and the main platforms are again moved into their extended positions.

With particular reference to FIG. 9, it is to be noted that the main platforms 61 can be positioned around trees in a different manner from that described above and particularly for trees 160 that have low hanging branches 161 under which it is difficult or impossible to extend the platforms. For example, orange and other citrus trees have this characteristic. In this operation of the scaffold, the main platforms are collapsed in upright V-shaped relation with the slide collars 55 adjacent to the lower ends 36 of the masts 35 and rested on the support collars 45 and with the outer edges 63 of the main platforms above the inner edges 62. This is accomplished by winding in the intermediate cables 124 and the outer cables 134 and by paying out the inner cables 114. Again, the outer edges 63 of the main platforms are inside of the wheels 18 and permit movement of the scaffold between the rows of trees.

The scaffold is stopped between four trees 160, as before, and the slide collars 55 elevated on the masts 35 until said collars are adjacent to the tops of the trees as illustrated at the top of FIG. 9. In this position, the main platforms 61 extend upwardly from the slide collars and, to permit such upward movement, it is necessary to pay out the cables 124 and 134. Thereafter, however, said cables are further payed out to lower the main platforms into their extended horizontal positions, as also illustrated in dashed lines at the top of FIG. 4. This brings the tree-receiving openings 75 individually into registration with the trees. Thereupon, the cables are all payed out to lower the platforms around the trees to the desired height. The main platforms are removed from the trees by following a reverse procedure. It is evident that if the main platforms were always extended about trees from the tops thereof, the slots 76 would not be needed. However, if not prohibited by tree shape or growth, extension from under the branches, as first described above, is preferred.

From the foregoing, it will be evident that an improved retractable scaffold has been provided which is collapsible for highway travel, for movement between adjacent rows of trees in an orchard, or the like, and which includes platforms which can be extended into elevated, workmen support positions substantially circumscribing trees, or other upright objects, to be attended to.

Although the invention has been herein shown and described in what is conceived to be the most practical and preferred embodiment, it is recognized that departures may be made therefrom within the scope of the invention, which is not to be limited to the details disclosed herein but it is to be accorded the full scope of the claims so as to embrace any and all equivalent devices and apparatus.

Having described my invention, what I claim as new and desire to secure by Letters Patent is:

1. A retractable mobile scaffold for supporting a workman in elevationally adjacent relation to an upright object comprising an elongated frame having opposite ends and opposite sides; means supporting the frame in a substantially horizontal position for earth-traversing movement longitudinally of the frame; a plurality of elongated masts rigidly upwardly extended from the frame in longitudinally spaced relation to each other and in a substantially common erect plane inwardly spaced from a side of the frame; an elongated, substantially rectangular main platform having front and rear edges interconnected by inner and outer side edges; means elevationally slidably borne by the masts and pivotally connected to the inner edge of the platform for elevational pivotal movement of the platform about a substantially horizontal axis extended longitudinally of the frame between a substantially upright retracted position adjacent to the masts, a downwardly extended retracted position alongside the mast, and a substantially horizontal workman support position laterally outwardly extended from the masts; powered inner control means borne by the frame and connected to the slidable means for elevationally adjusting the inner edge of the platform on the masts; and powered outer control means borne by the frame and connected to the platform in outwardly spaced relation to the inner edge thereof for pivoting the platform about its axis between said retracted and workman support positions.

2. The scaffold of claim 1 wherein said inner and outer control means each includes a winch mounted on the frame, pulleys mounted on the masts, inner and outer cables trained over the pulleys and respectively interconnecting the winches and said slidable means and said platform outwardly of the inner edge.

3. The scaffold of claim 1 wherein the platform is extended downwardly alongside of the mast in said retracted position, and wherein a camming plate is mounted on the frame having upwardly disposed side edges downwardly outwardly extended from the mast and engageable by the mast for urging the same away from the mast during movement into said support position.

4. A retractable mobile scaffold for supporting workmen in elevationally adjacent relation to trees in an orchard comprising an elongated substantially horizontal frame having opposite ends and opposite sides; ground engaging wheels of predetermined diameter supporting the frame for earth-traversing movement longitudinally thereof between adjacent rows of trees in such an orchard; a plurality of elongated masts rigidly upwardly extended from the frame in longitudinally spaced relation to each other and in a substantially common erect plane disposed longitudinally of the frame between the opposite sides thereof; stationary collars individually fitted on the masts in elevationally fixed positions and with all of the stationary collars being in a substantially common horizontal plane; slide collars individually elevationally slidably fitted on the masts for slidable movement between positions rested on their respective stationary collars and positions upwardly spaced therefrom; a pair of substantially rectangular platforms having inner edges respectively pivotally connected on opposite sides of the slide collars for elevational pivotal movement about a substantially common horizontal axis in said plane of the masts, longitudinally extended outer edges, substantially circular tree-receiving openings, and tree-trunk-receiving slots wider than the diameter of the wheels and laterally outwardly extended from the openings to the respective outer edges of the platforms, each slot being in an upright plane extended transversely of the frame through the center of its respective opening and the adjacent wheel on its respective side of the frame, and said platforms being longitudinally hingedly divided into inner and outer sections along longitudinal axes substantially parallel to said inner and outer edges and extended through the centers of the openings; inside elevational control means borne by the frame and the masts and connected to the slide collars for elevationally adjustably sliding such collars on the masts thereby elevationally to adjust the inner edges of the platforms; and outside elevational control means borne by the frame and the masts and connected to the platforms in outwardly spaced relation to their respective inner edges for elevationally pivoting the platforms about their horizontal pivot axes whereby the platforms are movable between transport positions wherein the platforms selectively are carried in inverted V-shaped relation and extended workman support positions in a substantially common horizontal plane with the slide collars rested on said stationary collars.

5. In a mobile scaffold for supporting workmen in an elevated position adjacent to an upright object; the combination of a frame, a mast having a substantially vertical axis rigidly upwardly extended from the frame, said mast having a collar slidably mounted thereon, a platform pivotally connected to said collar and having opposite side edges, said platform being hingedly divided into a plurality of sections, powered means connected between the frame and the collar for elevationally adjusting said collar on the mast, powered means connected to the sections individually controlling said sections whereby said side edges of the platform selectively are motivated through arcuate paths of travel about said pivotal connection of the platform to the collar and through substantially horizontal paths of travel outwardly from the collar in a plane normal to the axis of the mast between a retracted position with the side edges disposed in opposed relation adjacent to the mast and a workmans support position with the side edges oppositely laterally outwardly disposed from the mast in substantially horizontal coplanar relation, and said platform having a substantially circular tree receiving aperture disposed therein substantially equidistantly between said inner and outer edges, said aperture opening outwardly through said outer edge of the platform to provide a receiving slot therein.

6. In a mobile scaffold for supporting a workman in elevated position adjacent to a tree or other object; a frame; a mast rigidly upwardly extended from the frame; a main platform having an inner edge and an outer edge; means pivotally supporting the inner edge of the platform on the mast for pivotal movement of the platform about a substantially horizontal axis in the plane of the platform and for elevational adjustable movement of the inner edge of the platform relative to the outer edge thereof; powered means borne by the frame and connected to the inner edge supporting means for elevationally adjusting the inner edge of the platform on the mast; platform support means mounted on the frame and connected to the platform in laterally outwardly spaced relation to the inner edge of the platform for supporting the platform and pivoting the same about said horizontal axis between a retracted position extended longitudinally of and adjacent to the mast and a work position extended outwardly from the mast, said platform including inner and outer sections hingedly interconnected for pivotal movement about an elongated axis between and substantially parallel to the inner and outer edges with the platform support means being connected to the inner section of the platform; and control means on the frame connected to the outer section of the platform for pivoting the outer section between a folded position in opposed relation to the inner section and a position substantially coplanar with the inner section, said platform having an opening spaced between said inner and outer edges and an elongated slot extended from the opening to the outer edge of the platform for initially receiving such an object during movement of the platform into said work position.

References Cited in the file of this patent

UNITED STATES PATENTS

| | | |
|---|---|---|
| 364,186 | Opp | May 31, 1887 |
| 1,104,685 | Lofgren | July 21, 1914 |
| 1,231,823 | Weasler | July 3, 1917 |
| 1,555,103 | Christian | Sept. 29, 1925 |
| 2,043,128 | Sutton | June 2, 1936 |
| 2,582,528 | Cranford | Jan. 15, 1952 |
| 2,641,785 | Pitts | June 16, 1953 |

FOREIGN PATENTS

| | | |
|---|---|---|
| 626,553 | Germany | Feb. 28, 1936 |